(12) United States Patent
Strobl

(10) Patent No.: US 12,710,401 B2
(45) Date of Patent: Aug. 18, 2026

(54) METHOD FOR DETERMINING WHETHER DEFECTS ARE PRESENT IN THE MATERIAL OF A CERAMIC COMPONENT

(71) Applicant: AKTIEBOLAGET SKF, Gothenburg (SE)

(72) Inventor: Stefan Strobl, Garsten (AT)

(73) Assignee: AKTIEBOLAGET SKF, Gothenburg (SE)

( * ) Notice: Subject to any disclaimer, the term of this patent is extended or adjusted under 35 U.S.C. 154(b) by 256 days.

(21) Appl. No.: 18/234,149

(22) Filed: Aug. 15, 2023

(65) Prior Publication Data

US 2024/0077458 A1 Mar. 7, 2024

(30) Foreign Application Priority Data

Sep. 6, 2022 (DE) ........................ 102022209243.0

(51) Int. Cl.
*G01N 29/32* (2006.01)
*G01N 29/12* (2006.01)
*G01N 29/30* (2006.01)

(52) U.S. Cl.
CPC ........... *G01N 29/326* (2013.01); *G01N 29/12* (2013.01); *G01N 29/30* (2013.01); *G01N 2291/0232* (2013.01)

(58) Field of Classification Search
CPC ...... G01N 29/326; G01N 29/12; G01N 29/30; G01N 2291/0232; G01N 29/348;
(Continued)

(56) References Cited

U.S. PATENT DOCUMENTS 4,559,824 A 12/1985 Soma et al.
5,062,296 A * 11/1991 Migliori ................ G01N 29/12 73/659
(Continued)

FOREIGN PATENT DOCUMENTS

AT 516082 B1 2/2018
DE 102010017351 A1 11/2015
(Continued)

OTHER PUBLICATIONS

Extended European Search Report from the European Patent Office dated Feb. 5, 2024 in related EP application No. 23190037.4 including Search Opinion and Search Report and machine translation thereof.

*Primary Examiner* — Tarun Sinha
(74) *Attorney, Agent, or Firm* — J-TEK LAW PLLC; Scott T. Wakeman; Mark A. Ussai

(57) ABSTRACT

A method for determining whether a defect is present in a ceramic component includes determining a temperature difference between a first temperature and a second temperature based on an intended use of the ceramic component, bringing the ceramic component to a first temperature, after bringing the ceramic component to the first temperature, bringing the ceramic component to a second temperature, performing a resonance ultrasound spectroscopy on the ceramic component after bringing the ceramic component to the second temperature to produce an ultrasound spectrum of the ceramic component, comparing the ultrasound spectrum with a reference spectrum to determine a degree of similarity between the ultrasound spectrum and the reference spectrum, and determining from the degree of similarity whether the defect is present in the ceramic component.

15 Claims, 2 Drawing Sheets

(58) Field of Classification Search
CPC ..... G01N 2291/0289; G01N 2291/102; G01N 29/228; G01N 29/2437; G01N 29/4436; G01N 29/46; G01N 29/22; G01N 2291/014; G01N 2291/0258
See application file for complete search history.

(56) References Cited

U.S. PATENT DOCUMENTS

| | | | | |
|---|---|---|---|---|
| 5,425,272 | A * | 6/1995 | Rhodes .................. | G01N 29/30 73/579 |
| 5,826,213 | A * | 10/1998 | Kennefick ............... | G06F 30/20 73/87 |
| 6,057,030 | A | 5/2000 | Mano | |
| 2008/0093779 | A1 | 4/2008 | Cutler et al. | |
| 2010/0193001 | A1 | 8/2010 | Hirono et al. | |
| 2017/0219505 | A1 * | 8/2017 | Schoeppl ........... | G01N 21/8803 |
| 2018/0037490 | A1 | 2/2018 | Roßmeier et al. | |

FOREIGN PATENT DOCUMENTS

| | | | |
|---|---|---|---|
| DE | 102016201647 | A1 | 8/2017 |
| EP | 0655623 | A1 | 5/1995 |
| EP | 3180610 | A1 | 6/2017 |
| EP | 3203208 | A2 | 8/2017 |
| JP | H0886731 | A | 4/1996 |
| WO | 2013162521 | A1 | 10/2013 |
| WO | 2016023055 | A1 | 2/2016 |

* cited by examiner

METHOD FOR DETERMINING WHETHER DEFECTS ARE PRESENT IN THE MATERIAL OF A CERAMIC COMPONENT

CROSS-REFERENCE

This application claims priority to German patent application no. 10 2022 209 243.0 filed on Sep. 6, 2022, the contents of which are fully incorporated herein by reference.

TECHNOLOGICAL FIELD

The present invention relates to a method for determining whether defects are present in the material of a ceramic component.

BACKGROUND

Ceramic components are used in a variety of applications, for example, in rolling-element bearings, and plain bearings and also as rollers, cutting elements, implants, and the like. High mechanical loads or temperatures often act on the components, for example, at the surface.

The ceramic components can sometimes have defects in the material, such as, for example, cracks, scratches, pores, material inclusions, and/or missing material. These defects may be present on the surface but also in other regions. These defects can be present for different reasons, for example, having arisen in a manufacturing process or during a post-processing such as grinding, honing, or the like. The defects can cause the ceramic component to fail due to stresses. The defect can grow under a load and therefore lead to an undesirable material failure.

In order to prevent this, there are conventional testing methods with which defective components are detected and rejected. For example, the components may be subjected to a thermal shock treatment. For this purpose the ceramic components are subjected to a rapid cooling within a short time in order to bring defective components to failure in a targeted manner. A detection of emerging surface cracks is performed acoustically and/or optically during a cooling. If a growth of a crack is detected, the component is eliminated. However, under unfavorable conditions the bench test can be relatively unspecific. Since no distinction is made between critical and non-critical cracks, components may also be eliminated that are usable. It is also possible that the defects present do not lead, due to the thermal shock treatment, to surface cracks that lead to an acoustic change, with the result that defective components are not rejected.

SUMMARY

It is therefor an aspect of the present disclosure to provide an improved method for determining whether defects are present in the material of a ceramic component. Another aspect of the disclosure is determining whether the defects are of a type and/or amount that render the component unsatisfactory for an intended use.

In the following, a method is disclosed for determining whether defects are present in the material of a ceramic component. The method includes: determining a temperature difference between a first temperature and a second temperature based on an intended purpose of the component, tempering the component at a first temperature, tempering the component at a second temperature, performing a resonance ultrasound spectroscopy of the component after the tempering at the second temperature, recording an ultrasound spectrum of the component, evaluating the recorded ultrasound spectrum, comparing the evaluated ultrasound spectrum with a reference spectrum, and determining from the comparison whether defects are present in the material of the component. As used herein, the term "tempering" should be understood in the sense of bringing an object to a given temperature whether by heating or cooling.

Resonance ultrasound spectroscopy (RUS) is a technique with which basic material properties that relate to the elastic properties can be measured. This technique is based on the fact that solid bodies have natural frequencies at which they oscillate when they are stimulated mechanically. The natural frequency depends among other things on the a density and an elasticity modulus of the material used, as well as the size, the shape, and the mass of the object. Resonance ultrasound spectroscopy uses this property of solid bodies for determining the elasticity tensor of the material. Here the total elasticity tensor of a sample can advantageously be determined in a single rapid measurement. In a resonance ultrasound spectroscopy, the component to be examined is usually held between a device generating ultrasound waves, which device is configured to generate an elastic wave with varying frequency, and a device detecting ultrasound waves, which device is configured to record the resonances of the examined component. For example, a piezoelectric converter can be used as an ultrasound-wave-generating device. In addition, for example, a piezoelectric converter and/or a laser can be used as an ultrasound-wave-detecting device. For example, in the above-mentioned method the resonance ultrasound spectroscopy can be performed in a frequency range between 100 kHZ and 100 MHz. While a frequency range is traversed, a sequence of resonance peaks is recorded. The position of these peaks falls at the natural frequencies of the component, wherein the elastic constants can be determined from the natural frequencies.

Since both superficial and deeper-lying defects in the material of the component affect the natural frequencies of the component, in addition to surface cracks, defects lying inside the material of the component can advantageously also be detected. Here the defects in the material can be pores, material inclusions, agglomerates, and/or cracks. These defects can have emerged during the tempering of the component or can even already have been present before the tempering.

During the comparison, it can be checked whether the recorded ultrasound spectrum of the component corresponds to a reference spectrum; i.e., whether the determined natural frequencies of the component are consistent with the frequencies of the reference spectrum. In this case, it can be assumed that no defects are present in the material of the component. However, if it is determined that the natural frequencies of the component are displaced and/or significantly changed in comparison to the reference spectrum, it can be assumed therefrom that defects are present in the material of the component that lead to a change of the natural frequencies of the component.

In the following, the term "pore" is understood to mean a clearly delimited cavity in the surface, in which a depth, position, shape, and/or size can vary. Pores can occur isolated or in clusters.

Furthermore, the term "material inclusion" is understood to mean an exogenous or endogenous material that is captured in the component. Here an "endogenous material inclusion" is a heterogeneity of an intergranular phase that has a different appearance depending on the type of heterogeneity. In particular, the type of the heterogeneity can be a ceramic second phase, a high density of specific additives, or a low density of specific additives, in which a "ceramic second phase" is understood to mean an inhomogeneously distributed phase that can be partially comprised of a glass phase. Furthermore, a depth, position, shape, and/or size of the material inclusion can vary. Material inclusions can occur in particular isolated or in clusters.

The tempering can be, for example, a heating or a cooling of the component. Under certain circumstances, the second temperature can be lower than the first temperature. The tempering can be effected, for example, in a gas, for example, in air, for example, in an oven and/or in a liquid, for example, in a bath, but also with radiation, for example, with a laser. The first tempering can possibly be a heating that is effected in an oven, and the second tempering can be a cooling that is effected in a liquid bath, for example, in water or in oil. However, a tempering, for example, a heating, but also a cooling, can be effected here under any configurable atmosphere, but also under vacuum.

Furthermore, the tempering at the first temperature and the tempering at the second temperature can be effected in the form of a thermal shock treatment. A "thermal shock treatment" can mean, for example, an impulsive, i.e., occurring in a short time, temperature increase or cooling of a ceramic component. A short time duration can last, for example, less than 1 hour, 50 min, or 30 min. The thermal shock treatment is preferably effected in the range of 0.01 to 100 seconds.

The ceramic component can be all possible components that at least partially comprise a ceramic material or are manufactured from a ceramic material, for example, an implant for a human or animal body, for example, a joint, a bone screw, a dental prosthesis, a dental bridge, or the like. Furthermore the component can be a bearing component for a rolling-element or plain bearing, for example, a bearing ring, or a rolling element, or in general for rolling-element, rolling, and sliding applications. In addition, the components can also be a valve, a nozzle body, a cutting element, a ceramic circuit board, a functional component, or the like. Some of the components here can also contain metallic or organic materials. In all of these components, a failure can be undesirable and lead to significant post-processing, and possibly, in the case of implants, the need for surgery.

Furthermore, the ceramic component can comprise as material $Si_3N_4$ (silicon nitride), SiAlON (silicon aluminum oxynitride), SiC (silicon carbide), $Al_2O_3$ (aluminum oxide), $ZrO_2$ (zirconium oxide), ZTA (zirconium-oxide-reinforced aluminum oxide), ATZ (aluminum-oxide-reinforced zirconium oxide) and the like, and/or their mixtures. Under certain circumstances, at least one of these materials can constitute at least 50 weight-% of a total weight of the component. The component can possibly also be manufactured entirely from one of these materials.

Depending on the intended purpose, it can be necessary that the component should have a certain resistance, toughness, strength and/or maximum defect size in order to fulfill the intended purpose. In order to ensure this, the first temperature at which the component is tempered, the second temperature at which the component is tempered, and/or the temperature difference is chosen such that a sufficiently high thermal load is generated in the component. The method preferably further comprises determining the temperature difference based on a minimum fracture toughness. The minimum fracture toughness can be, for example, a value prescribed by an operator or user who is to have the component in order to fulfill the intended use. A minimum fracture toughness can be determined here, for example, based on experience values, experiments, or the like. A minimum required fracture toughness can be, for example, at least 4.0 MPa $m^{1/2}$.

The temperature difference can be determined, for example, starting from the Griffith/Irwin criterion:

$$K \geq K_c \text{ with } K=\sigma_{Ref} Y \sqrt{a\pi}$$

K stands here for the stress intensity factor. $K_c$ represents the critical stress intensity factor or the fracture toughness. $\sigma_{Ref}$ stands for a reference stress in a sample without cracks. a stands for the size of the crack, and Y represents a geometric factor, using which the geometry of the crack, of the stress field, and of the test body is taken into account.

The thermally induced stress $\sigma_{th}$, or its maximum value $\sigma_{th,max}$ at a surface under tensile stress can generally be represented with the following equation:

$$\sigma_{th,max} = \hat{\sigma}^*_{th} \frac{\alpha E}{1-\nu} \Delta T$$

$\alpha$ is the linear coefficient of thermal expansion, E stands for the elastic modulus, $\nu$ for the Poisson ratio, and $\Delta T$ for the temperature difference in the thermal shock treatment. The dimensionless factor $\hat{\sigma}^*_{th}$ refers to the Biot number, which can be determined from the component geometry, the thermal conductivity, and the heat transfer. This factor falls between the value 0 with very gentle cooling, and the value 1 for a very rapid quenching process.

For the specific test with the presence of a crack with the length a, the stress intensity factor K can be represented as follows:

$$K = \Delta T_c \frac{\alpha eff E}{1-\nu} \sigma^*_{th,max} Y_{max} \sqrt{a\pi}$$

$Y_{max}$ here is the maximum of the geometry factor Y at a certain point of the crack. This is dependent on the crack shape and can be determined by a parameter study. The elongation of a crack or of a defect occurs when corresponding to equation the fracture toughness $K_c$ of the material is reached at the location of the crack or defect. By reformulating the above equation for idealized conditions such as temperature-dependent material parameters and low stress changes over the course of the crack it results that with prescribed test geometry and required fracture toughness a certain critical crack size corresponds to a certain critical temperature difference $\Delta T_c$ in the thermal shock treatment. Under non-idealized conditions, this temperature difference can be calculated numerically. If the temperature difference is set accordingly, in some exemplary embodiments it can be ensured that all components that withstand the thermal shock treatment with the specified temperature difference are suited for use in operation or have the minimum required fracture toughness. Components in which cracks arise during testing that exceed a threshold value can be eliminated.

Additionally or alternatively, taking into consideration the component-specific and systematic errors for determining the fracture toughness of rolling-element bearing balls made from silicon nitride, the estimated measurement error for the calculated fracture toughness can at most fall in the range of +−10%. In some exemplary embodiments the components tested using the method can have a sufficient safeness against failure.

Additionally or alternatively a value for the fracture toughness can be taken from a table and/or experimentally determined. In order to determine a fracture toughness experimentally, a fracture toughness can be determined, for example, on a so-called test component using the following method. For example, the sample component can have the same shape, sizes, and material properties as the ceramic component.

For this purpose a semi-elliptical surface crack is introduced using, for example, a Knoop indenter for the purpose of good reproducibility of the crack geometry. In the table below, a Knoop indent with a load of 10 and 7 kg (HK10, HK7) was applied to silicon nitride rolling-element bearing balls with different diameter D. The material plastically deformed at the component surface is preferably removed by removing a thin surface layer in order to keep the influence of introduced residual stresses on the measurement result low. The removed layer should be at least ⅙ of the longer diagonal of the Knoop indent. By introducing a specific temperature difference $\Delta T$ in the thermal shock experiment, a fracture toughness $K_{surv}$ is obtained where no fracture growth is yet recognizable. With further increase of the $\Delta T$, fracture growth occurs with fracture toughness $K_{frac}$. Here the critical fracture toughness $K_c$ has already been exceeded, which correlates with $\Delta Tc$ in accordance with equation. With the quenching of ceramics in water, according to experience the heat transfer coefficient hf falls in the range from 75000 to 10000 $Wm^{-2}K^{-1}$. Bi is a dimensionless Biot number from the modeling of the temperature field of the ball. The fracture toughness calculated in this manner can also be referred to, for example, as the measured fracture toughness.

According to a further preferred embodiment, the method further comprises checking the component with respect to its suitability for use, wherein the component is considered suitable for use when deviations between the recorded ultrasound spectrum and the reference spectrum are smaller than a prescribed limit value. In particular, at least the risk that a failure occurs can be reduced by the method or the use of components that have been tested using the method. The component is preferably considered suitable for use when the determined elasticity modulus of the component deviates less than 5%, preferably less than 2%, even more preferably less than 1%, from the expected elasticity modulus. Furthermore, the component can be regarded as unsuitable for use when one or more resonance peaks are missing in the recorded ultrasound spectrum in comparison to the reference spectrum.

A further preferred embodiment comprises a method for determining whether a defect is present in a ceramic component which method includes determining a temperature difference between a first temperature and a second temperature based on an intended use of the ceramic component, bringing the ceramic component to a first temperature, after bringing the ceramic component to the first temperature, bringing the ceramic component to a second temperature, performing a resonance ultrasound spectroscopy on the ceramic component after bringing the ceramic component to the second temperature to produce an ultrasound spectrum of the ceramic component, comparing the ultrasound spectrum with a reference spectrum to determine a degree of similarity between the ultrasound spectrum and the refer-

| | $h_f$ = 75000 $Wm^{-2}K^{-1}$ | | | $h_f$ = 100000 $Wm^{-2}K^{-1}$ | | |
|---|---|---|---|---|---|---|
| | Bi — | $K_{surv}$ MPa $m^{1/2}$ | $K_{frac}$ MPa $m^{1/2}$ | Bi — | $K_{surv}$ MPa $m^{1/2}$ | $K_{frac}$ MPa $m^{1/2}$ |
| Set 1, D = 12.7 mm, HK10 | 22.0 | 5.3 ± 0.3 | 5.5 ± 0.3 | 29.3 | 5.7 ± 0.3 | 5.9 ± 0.3 |
| Set 2, D = 5.55 mm, HK10 | 10.2 | 5.5 ± 0.3 | 5.9 ± 0.3 | 13.7 | 6.0 ± 0.3 | 6.4 ± 0.3 |
| Set 3, D = 5.55 mm, HK7a | 10.6 | 5.7 ± 0.1 | 6.0 ± 0.2 | 14.2 | 6.2 ± 0.1 | 6.5 ± 0.2 |

According to a further exemplary embodiment, the reference spectrum is determined based on a geometry and/or size of the component and from at least one elastic constant of a material of the component. From the known geometric parameters of the component, such as, for example, shape, diameter, and/or dimensions, and from the elastic material constants, the natural frequencies of the component can be calculated. The at least one elastic constant of the material is preferably the elasticity modulus and/or the Poisson number. Advantageously, by determining the reference spectrum by calculation, it can be assumed that there are no defects in the material, so that the reference spectrum represents a spectrum of a component without defects.

Furthermore, evaluating the recorded ultrasound spectrum can comprise determining at least one elastic material constant of the component. As performed above, the natural frequencies of the component can be determined by resonance ultrasound spectroscopy. These can in turned be used, together with the known geometric parameters of the component, to determine the at least one elastic material constant of the component. The determined elastic material constant can preferably be the elasticity modulus and/or the Poisson number. In particular, it can be concluded from a deviation of the determined elastic material constant from the expected elastic material constant that defects are present in the material of the component.

ence spectrum, and determining from the degree of similarity whether the defect is present in the ceramic component.

Further advantages and advantageous embodiments are specified in the description, the drawings, and the claims. Here in particular the combinations of features specified in the description and in the drawings are purely exemplary, so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

Figure 1:
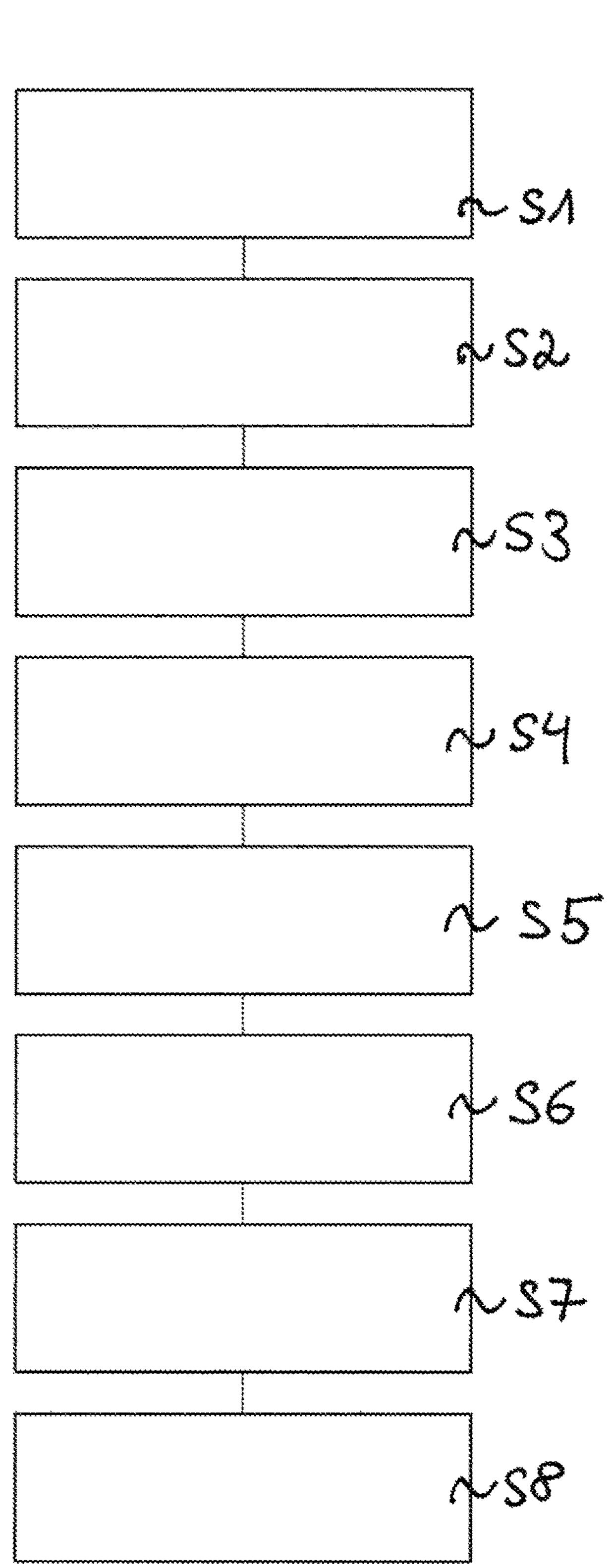
FIG. 1 is a schematic representation of a method for determining whether defects are present in the material of a ceramic component, according to one exemplary embodiment of the present disclosure.

In the following description of the accompanying Figures, like reference numerals refer to like or comparable components. Furthermore, summarizing reference numbers are used for components and objects that appear multiple times in an exemplary embodiment or in an illustration but that are described together in terms of one or more common features. Components or objects that are described with the same or summarizing reference numbers can be embodied identically, but also optionally differently, in terms of individual, multiple, or all features, their dimensions, for example, as long as the description does not explicitly or implicitly indicate otherwise.

Figure 2:
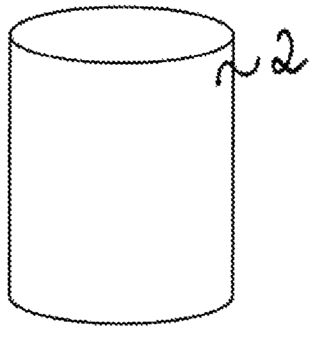
FIG. 2 is a schematic representation of a component, in which it has been determined according to the method whether defects are present in the material of the ceramic component.
Figure 3:
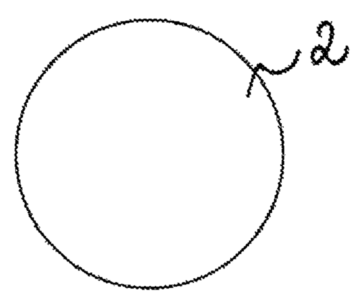
FIG. 3 is a schematic representation of a further component, in which it has been determined according to the method whether defects are present in the material of the ceramic component.

FIG. 1 shows a method 1 for determining whether defects are present in the material of a ceramic component 2. Representative examples of components on which the method can be performed or has been performed are illustrated in FIGS. 2 and 3. For this purpose, in a first step S1 a temperature difference is determined between a first temperature and a second temperature based on an intended use of the component 2. For example, the temperature difference can be determined based on a minimum fracture toughness. The minimum fracture toughness can be, for example, a value prescribed by an operator or user who is to have the component in order to fulfill the intended use. A minimum fracture toughness can be determined here, for example, based on experience values, experiments, or the like.

In a step S2, the component 2 is tempered at a first temperature, and subsequently in a further step S3 the component 2 is tempered at a second temperature. In some exemplary embodiments the component can be heated at the first temperature until the heated region or the entire component homogeneously has the first temperature. Subsequently the component can be cooled quickly. In some exemplary embodiments, simple geometric framework conditions for the calculation of the temperature difference can thereby be obtained. Alternatively the step of setting a constant or homogeneous first temperature in the component to be tested can be omitted. For example, only the surface or an edge layer can be heated to the first temperature and subsequently quickly cooled.

In embodiments in which the thermal shock treatment consists of rapid heating, i.e. the first temperature is lower than the second temperature, homogeneous tempering of the components or tempering of the edge layers only can also be carried out. Rapid heating can be selected, for example, for components in which internal tensile stresses can occur during operation, which can lead to compressive stresses in an external area. In the case of components where only one area subject to special stress during operation is to be tested, it may also be possible to temper only this area of the component with the first temperature and then the second temperature. For example, rapid heating can be carried out area by area using a powerful laser.

Following step S3, in a step S4 a resonance ultrasound spectroscopy of the component is performed, and in a step S5 an ultrasound spectrum of the component is recorded, in which the material properties of the component 2 are determined that relate to the elasticity. With resonance ultrasound spectroscopy, the natural frequencies with which the component 2 oscillates when it is stimulated mechanically can be determined. The natural frequency depends on the elasticity, the size, and the shape of the component 2. In order to perform the resonance ultrasound spectroscopy, the component 2 is held between a device generating ultrasound waves, which device is configured to generate an elastic wave with varying frequency, and an ultrasound-wave-detecting device that is configured to record the resonances of the component 2. A piezoelectric converter can be used, for example, as the ultrasound-wave-generating device and/or as the ultrasound-wave-detecting device. However, it is also possible to use a different detection device, such as, for example, a laser, for recording the natural frequencies. For example, the resonance ultrasound spectroscopy in method 1 can be performed in a frequency range between 100 kHz and 100 MHz.

As a frequency range is traversed, a sequence of resonance peaks is recorded. The position of these peaks lies in the natural frequencies of the component 2, wherein the elastic constants can be determined from the natural frequencies. In a step S6, the recorded ultrasound spectrum is evaluated, wherein, for example, the natural frequencies of the component 2 can be determined from the recorded spectrum. Furthermore, at least one elastic material constant of the component 2 can be determined from the recorded ultrasound spectrum. For this purpose the natural frequencies of the component 2, determined with the resonance ultrasound spectroscopy, can be used together with the known geometric parameters of the component 2 to determine at least one elastic material constant of the component. For example, the determined elastic material constant can be the elasticity modulus and/or the Poisson number.

In the next step S7, the evaluated ultrasound spectrum is compared with a reference spectrum. The reference spectrum can be determined based on, for example, a geometry and/or size of the component 2 and from at least one elastic constant of a material of the component 2 by calculating the natural frequencies of the component 2. Here in particular the at least one elastic constant of the material can be the elasticity modulus and/or the Poisson number. By calculating the reference spectrum, it can advantageously be assumed that no defects are present in the material, with the result that the reference spectrum represents a spectrum of a component without defects.

From the comparison obtained in step S7, in a step S3 it can be determined whether defects are present in the material of the component 2. In particular, it can be concluded from a deviation of the determined elastic material constant from the expected elastic material constant that defects are present in the material of the component 2. Furthermore, the component 2 can also be checked for its suitability for use, where suitability for use is found when deviations between the recorded ultrasound spectrum and the reference spectrum are smaller than a prescribed limit value. Alternatively or additionally, at least the risk that a failure occurs can be reduced by the method or by the use of components that have been tested with the method. For example, the component 2 can be considered as suitable for use when the determined elasticity modulus of the component deviates less than 5%, preferably less than 2%, even more preferably less than 1%, from the expected elasticity modulus.

The method can, for example, be suitable to be used in a running production. For this purpose it can be provided that the component 2 is continuously heated in an oven at the first temperature. For this purpose, for example, a conveyor can be provided, using which the component 2 is transported through the oven. The ceramic component 2 can subsequently be guided using the conveyor to a quenchant in order to be tempered to the second temperature. A liquid, for example, water or oil, is suitable as quenchant, for example. Furthermore, a gas can also be used as quenchant. With a quenching with gas, the gas can be guided to the body under increased pressure, for example under a pressure of 2 bar or higher. In other exemplary embodiments, in the first step 2 the component can also be partially or entirely heated using a gas burner and subsequently cooled using an air jet in the second step 3.

If the ceramic component 2 is guided using a conveyor to the liquid as quenchant, the components can be allowed to fall into the liquid in order to achieve the thermal shock treatment. Here the liquid has the second temperature. Alternatively, the component can also be submerged into the liquid.

Alternatively or additionally, the tempering at the first and the second temperature can be performed in a single device, for example, when working with a gas for a quenching from a first temperature. A combined heating and quenching system can possibly be used for this purpose. An example therefor is the heating in a vacuum hardening unit, in air, and/or in a protective gas, wherein heating can be used with or without vacuum, possibly a heating with subsequent high-pressure gas quenching.

In some exemplary embodiments, an inhomogeneous temperature field on or in the component can be set during the tempering. In some exemplary embodiments, a rapid heating of the component in combination with a rapid cooling can thereby be achieved. The thermal shock treatment can relate to a near-surface zone of the component or the entire component. It is also possible that the thermal shock treatment is carried out in a region in which a maximum stress of the component will occur during use. Under certain circumstances edges of a body can also be subjected to the thermal shock treatment.

FIGS. 2 and 3 show schematic representations of components 2 that have been examined with the method 1. The component 2 of FIG. 2 is a cylindrical roller, and the component 2 of FIG. 3 is a ball. The components 2 can serve, for example, as rolling elements. The components 2 have, as ceramic materials, at least one of the materials $Si_3N_4$, SiAlON, SiC, $Al_2O_3$, $ZrO_2$, ZTA or ATZ.

However, with the method 1 all possible other ceramic components can also be tested. These can be, for example, components that are installed in rolling-element, roller, or sliding applications. For this purpose the components are subjected as described to a thermal shock test and subsequently acted upon, for example, with crack-penetrating dye, in order to detect supercritically long cracks and thus to be able to eliminate components that are damaged or not suitable for use.

In summary, the use of resonance ultrasound spectroscopy makes it possible to determine whether defects are present in the material of a ceramic component, even if they do not present themselves on a surface of the component and thus are not detectable directly.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved methods for determining defects in ceramic components.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Method
2 Component
S1-S8 Method steps

What is claimed is:

1. A method for determining whether a defect is present in a ceramic component, the method comprising:

determining a temperature difference between a first temperature and a second temperature based on an intended use of the ceramic component, bringing the ceramic component to the first temperature, after bringing the ceramic component to the first temperature, bringing the ceramic component to the second temperature, performing a resonance ultrasound spectroscopy on the ceramic component after bringing the ceramic component to the second temperature to produce an ultrasound spectrum of the ceramic component, comparing the ultrasound spectrum with a reference spectrum to determine a degree of similarity between the ultrasound spectrum and the reference spectrum, determining from the degree of similarity whether the defect is present in the ceramic component, evaluating the ultrasound spectrum to determine an actual value of an elastic constant of a material of the ceramic component, wherein the reference spectrum is determined based on an expected value of the elastic constant of the material of the ceramic component if the ceramic component were defect-free, and wherein the comparing includes comparing the actual value of the elastic constant of the material of the ceramic component with the expected value of the elastic constant of the material of the ceramic component.

2. The method according to claim 1, wherein the elastic constant is an elasticity modulus and/or a Poisson number.

3. The method according to claim 2, wherein the temperature difference is based on a required minimum fracture toughness of the ceramic component.

4. The method according to claim 1, wherein the temperature difference is based on a required minimum fracture toughness of the ceramic component.

5. The method according to claim 1, wherein the defect is selected from a group consisting of: a pore, a crack and a material inclusion.

6. The method according to claim 1, wherein the reference spectrum is determined based on a geometry and/or size of the ceramic component and from at least one elastic constant of a material of the ceramic component.

7. The method according to claim 1, including rejecting the component if the degree of similarity is less than a predetermined degree.

8. The method according to claim 7, wherein the characteristic is an elasticity modulus of the component wherein the degree of similarity is a deviation of the actual value from the expected value of less than 5%.

9. The method according to claim 7, wherein the characteristic is an elasticity modulus of the component wherein the degree of similarity is a deviation of the actual value from the expected value of less than 2%.

10. The method according to claim 7, wherein the characteristic is an elasticity modulus of the component wherein the degree of similarity is a deviation of the actual value from the expected value of less than 1%.

11. The method according to claim 1, wherein the resonance ultrasound spectroscopy is performed in a frequency range between 100 kHz and 100 MHz.

12. The method according to claim 1, including recording an ultrasound spectrum of the component.

13. A method for determining whether defects are present in a material of a ceramic component, comprising:

determining a temperature difference between a first temperature and a second temperature based on an intended use of the component, bringing the component to the first temperature, after bringing the component to the first temperature, bringing the component to the second temperature, performing a resonance ultrasound spectroscopy of the component after bringing the component to the second temperature, recording an ultrasound spectrum of the component, evaluating the recorded ultrasound spectrum to determine an actual value of an elastic constant of a material of the component, comparing the evaluated ultrasound spectrum with a reference spectrum, and determining from the comparison whether defects are present in the material of the component, wherein the reference spectrum is determined based on an expected value of the elastic constant of the material of the component if the component were defect-free, and wherein the comparing includes comparing the actual value of the elastic constant of the material of the component with the expected value of the elastic constant of the material of the component.

14. The method according to claim 13, wherein the reference spectrum is determined based on a geometry and/or size of the component and from at least one elastic constant of a material of the component.

15. The method according to claim 14, wherein the at least one elastic constant of the material is an elasticity modulus and/or a Poisson number.

* * * * *